United States Patent
Hosomi et al.

(10) Patent No.: US 10,479,410 B1
(45) Date of Patent: Nov. 19, 2019

(54) VEHICLE BODY FRONT STRUCTURE

(71) Applicant: Nissan Motor Co., Ltd., Yokohama-shi, Kanagawa (JP)

(72) Inventors: Kouji Hosomi, Kanagawa (JP); Tsuyoshi Matsunaga, Kanagawa (JP); Ryuuji Ootani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/089,438

(22) PCT Filed: May 19, 2016

(86) PCT No.: PCT/JP2016/064824
§ 371 (c)(1),
(2) Date: Sep. 28, 2018

(87) PCT Pub. No.: WO2017/199386
PCT Pub. Date: Nov. 23, 2017

(51) Int. Cl.
*B62D 21/15* (2006.01)
*B62D 25/08* (2006.01)
(Continued)

(52) U.S. Cl.
CPC ......... *B62D 21/155* (2013.01); *B62D 25/085* (2013.01); *F16H 57/025* (2013.01); *F16H 57/035* (2013.01)

(58) Field of Classification Search
CPC .... B62D 21/155; B62D 21/15; B62D 21/152; B62D 25/085; F16H 57/025; F16H 57/035
See application file for complete search history.

(56) References Cited

U.S. PATENT DOCUMENTS

| | | | |
|---|---|---|---|
| 2003/0080587 A1* | 5/2003 | Kitagawa | B62D 21/155 296/187.09 |
| 2005/0067860 A1* | 3/2005 | Makita | B60R 19/24 296/203.02 |

(Continued)

FOREIGN PATENT DOCUMENTS

| | | |
|---|---|---|
| CN | 103359172 A | 10/2013 |
| CN | 104797489 A | 7/2015 |

(Continued)

*Primary Examiner* — Frank B Vanaman
(74) *Attorney, Agent, or Firm* — Global IP Counselors, LLP (57) ABSTRACT

A vehicle body front structure includes a powertrain, a pair of side members, a suspension member, a first load transmission member and a second load transmission member. The powertrain has an engine and a continuously variable transmission that are juxtaposed to each other along the vehicle width direction. The side members are disposed on the outside of the power train in the vehicle width direction. The suspension member is disposed below the side members. The first and second load transmission members mounted to the side members and the suspension member. In the power train, the continuously variable transmission is disposed on the load-transmission-member side, and has a pair of variable speed pulleys (an input-side pulley and an output-side pulley). Thus, the load received by the first and second load transmission members can be reliably transmitted to the engine through the variable speed pulleys.

3 Claims, 8 Drawing Sheets

(51) Int. Cl.
*F16H 57/025* (2012.01)
*F16H 57/035* (2012.01)

(56) References Cited

U.S. PATENT DOCUMENTS

| | | | | |
|---|---|---|---|---|
| 2006/0181071 A1* | 8/2006 | Mitsui | ................... | B62D 21/155 |
| | | | | 280/784 |
| 2006/0255625 A1* | 11/2006 | Kitoh | ................... | B62D 21/155 |
| | | | | 296/204 |
| 2012/0248820 A1 | 10/2012 | Yasui et al. | | |
| 2013/0256051 A1 | 10/2013 | Nakamura et al. | | |
| 2013/0320709 A1* | 12/2013 | Kuwabara | ............ | B62D 21/152 |
| | | | | 296/187.09 |
| 2013/0328334 A1* | 12/2013 | Hoiss | ................... | B62D 21/152 |
| | | | | 293/154 |
| 2015/0060181 A1* | 3/2015 | Klamser | ................ | B60R 19/40 |
| | | | | 180/274 |
| 2016/0023631 A1* | 1/2016 | Chu | ....................... | B43K 29/18 |
| | | | | 30/123 |
| 2017/0045134 A1* | 2/2017 | Wade | ..................... | F04D 25/02 |

FOREIGN PATENT DOCUMENTS

| | | | | |
|---|---|---|---|---|
| EP | 2921377 A1 | 9/2015 | | |
| JP | 2015-24766 A | 2/2015 | | |
| JP | 2015-36281 A | 2/2015 | | |
| JP | 5889438 B2 | 2/2016 | | |
| JP | 2016-55870 A | 4/2016 | | |
| JP | 2016-210336 | * 12/2016 | ............ | B62D 21/15 |
| WO | 2014/192176 A1 | 12/2014 | | |

\* cited by examiner

VEHICLE BODY FRONT STRUCTURE

CROSS-REFERENCE TO RELATED APPLICATIONS

This application is a U.S. national stage application of International Application No. PCT/JP2016/064824, filed on May 19, 2016.

BACKGROUND

Field of the Invention

The present invention relates to a vehicle body front structure of an automobile vehicle body.

Background Information

A structure in which a side member is disposed on a side portion of an automobile vehicle body is known from the prior art. Here, there are cases in which so-called small overlap collision occurs, in which an obstacle collides against a vehicle body from the front side of the vehicle body, at a position on the outer side of the side member in the vehicle width direction. The measure disclosed in the following Patent Document 1 is known as a countermeasure for this small overlap collision.

In Japanese Laid-Open Patent Application No. 2015-36281 (Patent Document 1), a spacer (load transmission member) that projects toward the outer side in the vehicle width direction is provided on the side portion of a suspension member. A power train is installed on the inner side of the spacer in the vehicle width direction. The power train comprises the transmission and the engine disposed along the vehicle width direction, where the transmission is disposed on the spacer side.

Thus, when a small overlap collision occurs in the vehicle, the collision load from the collision object is transmitted from the spacer to the engine via the transmission.

SUMMARY

However, in Patent Document 1, in the case that the strength of the transmission cannot withstand the collision load because the collision load is high, there is the risk that the transmission will be damaged, and it becomes difficult to transmit the collision load to the engine efficiently.

Thus, an object of the present invention is to provide a vehicle body front structure that, at the time of a small overlap collision, in which the collision load is input to a portion of the vehicle body that farther toward an outer side position than a side member in the vehicle width direction, efficiently transmits the collision load to the engine, which constitutes the power train.

The vehicle body front structure according to the present invention comprises a power train having an engine and a continuously variable transmission, a side member that is disposed on the outer side of the power train in the vehicle width direction, a suspension member that is disposed below the side member, and a load transmission member that is attached to at least one of the side member and the suspension member. In the power unit, a continuously variable transmission is disposed on the load transmission member side. The continuously variable transmission has a transmission pulley. The load transmission member comprises a load-receiving portion that receives the load, and a load transmission portion that transmits the load received by the load-receiving portion to the transmission pulley of the continuously variable transmission.

According to the vehicle body front structure of the present invention, it is possible to transmit the collision load that is received by a load transmission member to the engine efficiently via the transmission pulley of the continuously variable transmission at the time of a so-called small overlap collision, in which a collision object collides with an outer end portion of a host vehicle in the vehicle width direction.

DETAILED DESCRIPTION OF THE EMBODIMENTS

A vehicle body front structure according to an embodiment of the present invention will be described below with reference to the drawings. In the present embodiment, an embodiment variant is shown in which the load transmission member is provided on the left side of the vehicle, but the load transmission member may be provided on the right side of the vehicle, or on both the left and right sides.

Figure 2:
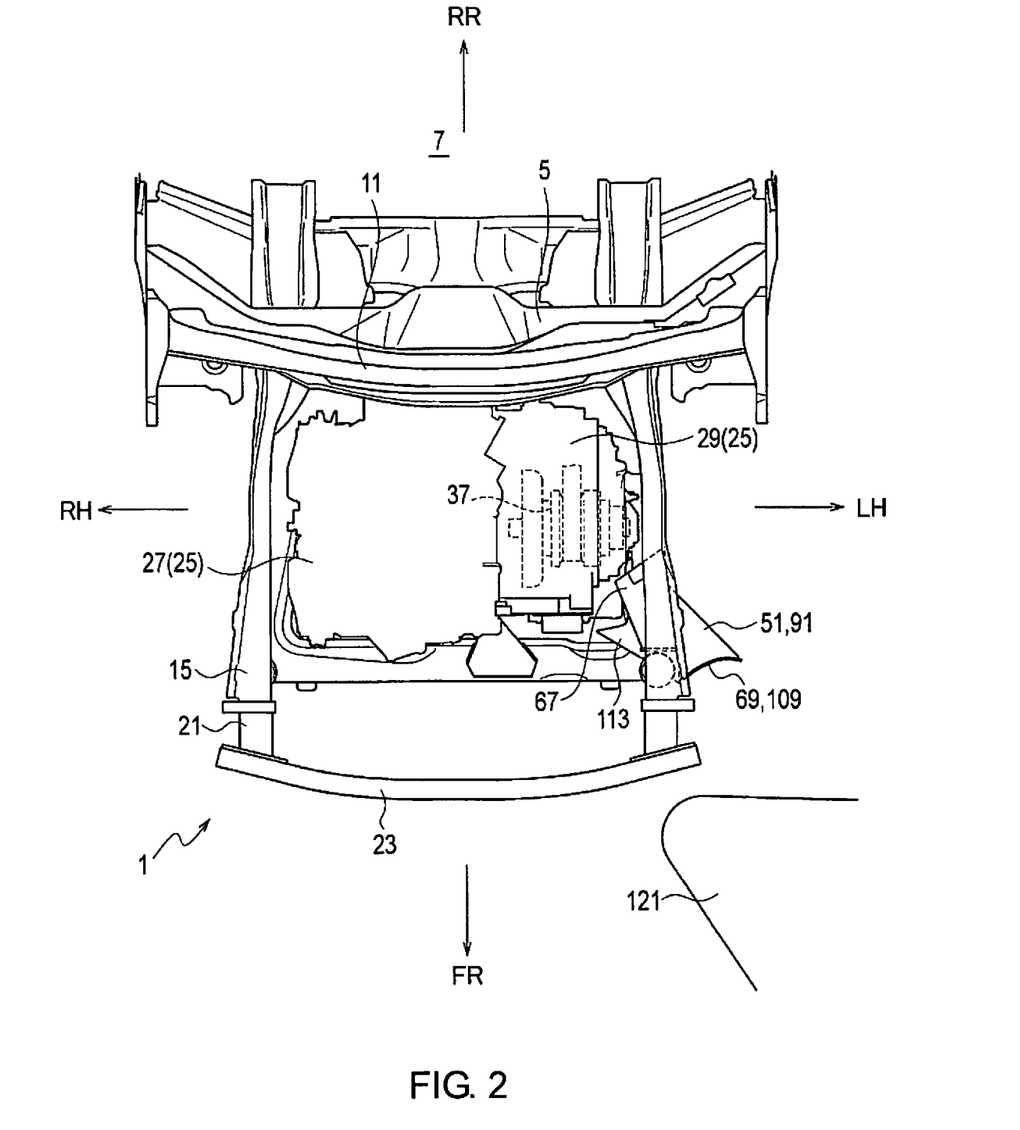
FIG. 2 is a top plan view of the vehicle body front structure illustrated FIG. 1, as viewed from above.
Figure 3:
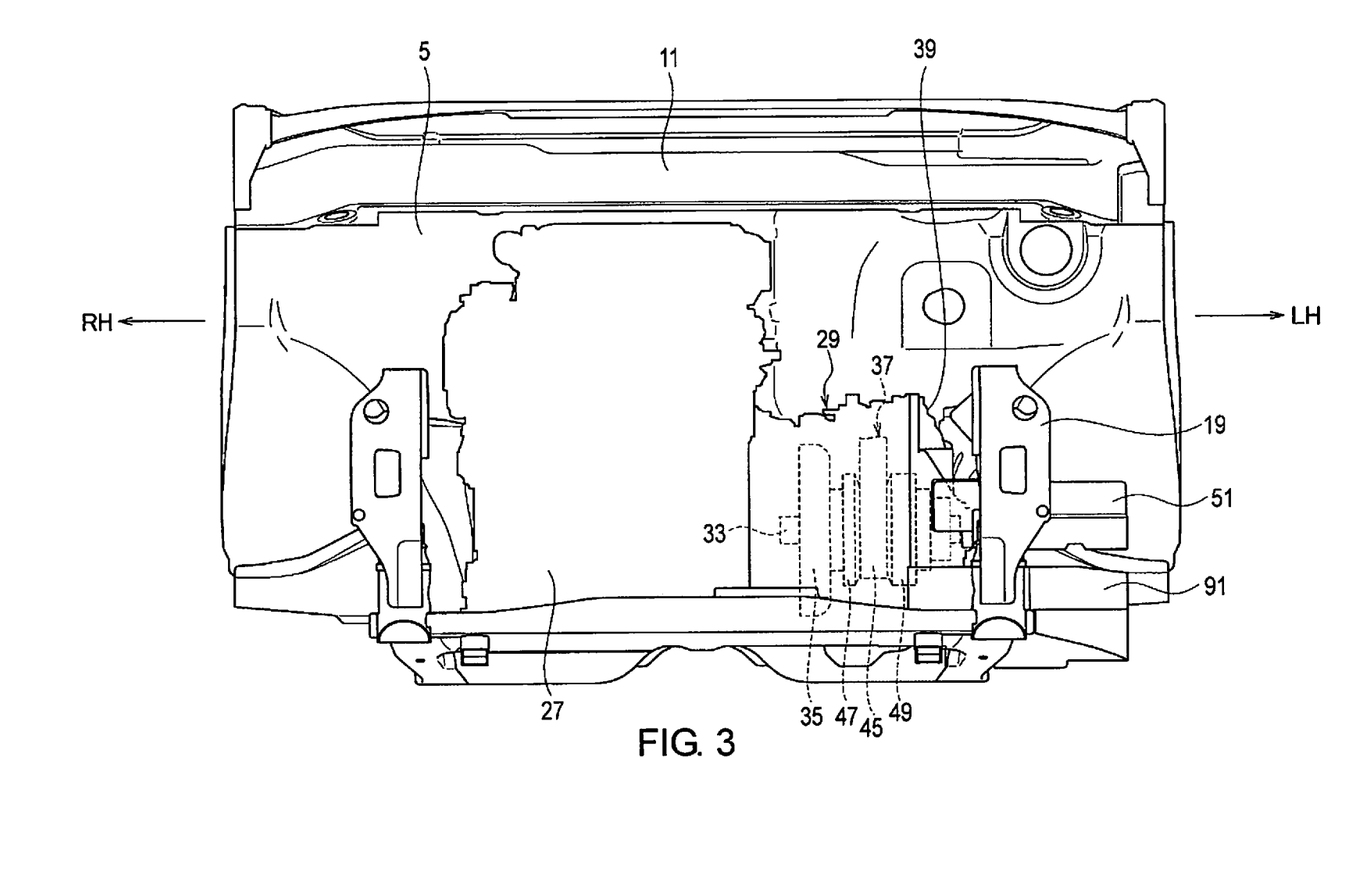
FIG. 3 is a front view of the vehicle body front structure illustrated FIGS. 1 and 2, as viewed from in front.
Figure 4:
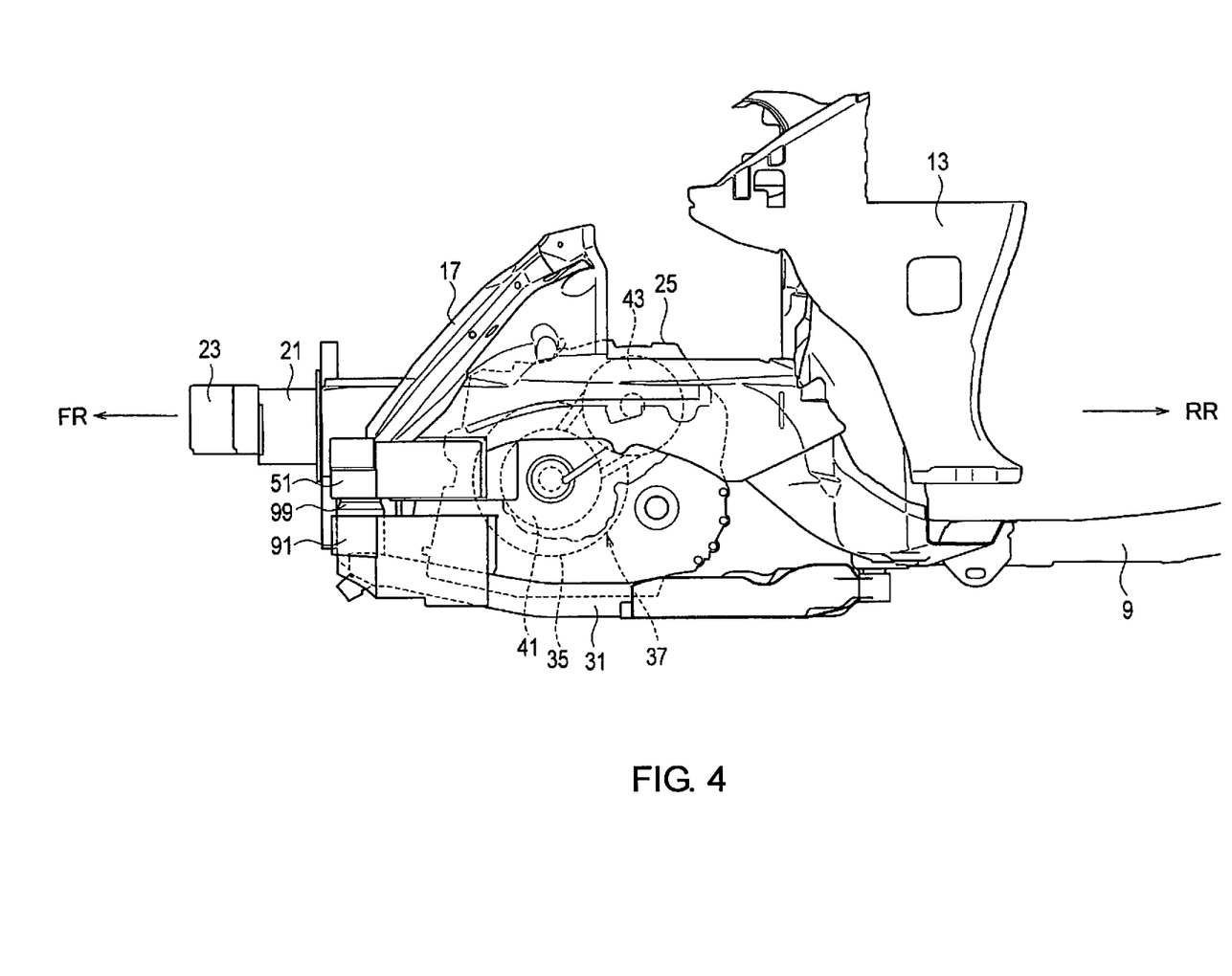
FIG. 4 is a side view of the vehicle body front structure illustrated FIGS. 1-3, as viewed from the left side of the vehicle.

The engine compartment 3 is disposed in the front portion 1 of the vehicle, as illustrated in FIGS. 1-4. A dash panel 5 that extends in the vertical direction and the left-right direction is disposed at the rear end of the engine compartment 3. A vehicle cabin 7 is provided behind the dash panel 5, and the engine compartment 3 is disposed in front of the dash panel 5. The side sill 9, disposed on the lower portion of the vehicle cabin 7, extends along the longitudinal direction of the vehicle, as illustrated in FIG. 4. In addition, a cowl top 11 is disposed at the upper end portion of the dash panel 5 along the vehicle width direction, and a body side panel 13 is disposed on the side of the cowl top 11 and the dash panel 5. Furthermore, a pair of left and right side members 15 that extend in the front-rear direction and extension members 17 that are disposed on the sides of the side members 15 are arranged on the sides of the engine compartment 3. The front end portion of the extension member 17 is fitted to the side portion of the side member 15. A longitudinally elongated plate-like panel 19 is joined to the front end of the side member 15, and a rectangular tube-shaped holding bracket 21 extends forward from the front end of the side member 15 via the plate-like panel 19. The pair of left and right holding brackets 21 are connected to each other by a bumper reinforcement 23 that extends in the vehicle width direction. A power train 25 is disposed in the central portion of the engine compartment 3. The power train 25 is composed of an engine 27 that is disposed on the right side of the vehicle and a continuously variable transmission 29 that is disposed on the left side of the vehicle of the engine 27 (load transmission member side). A suspension member 31 is disposed below the power train 25.

The continuously variable transmission 29, also referred to as a CVT (continuously Variable Transmission), transmits the rotary driving force from the engine 27 to the wheels. Specifically, as illustrated in FIGS. 2-4, the continuously variable transmission 29 comprises a main shaft 33 that extends in the vehicle width direction, a torque converter 35 that is pivotally supported by the main shaft 33 so as to be rotatable, a pulley unit 37 that is pivotally supported by the main shaft 33 so as to be rotatable, and a cover 39 that houses the main shaft 33, the torque converter 35, and the pulley unit 37. Because the pulley unit 37 and the cover 39 are cast products, the strength of the continuously variable transmission 29 according to the present embodiment is set higher than that of a conventional transmission.

The pulley unit 37 is composed of an input-side pulley 41 (transmission pulley) that is disposed on the lower side, an output-side pulley 43 (transmission pulley) that is disposed on the upper side, and a metal belt 45 that connects the input-side pulley 41 and the output-side pulley 43, as illustrated in FIG. 4. The input-side pulley 41 and the output-side pulley 43 are respectively composed of an inner-side pulley 47 (transmission pulley) that is disposed on the inner side in the vehicle width direction (center side of the vehicle) and an outer-side pulley 49 (transmission pulley) that is disposed on the outer side in the vehicle width direction. It is configured such that, when the space between the inner-side pulley 47 and the outer-side pulley 49 in the width direction is reduced, the rotational diameter of the metal belt 45 is increased. Of the parts that constitute the continuously variable transmission 29, the transmission pulleys (input-side pulley 41 and output-side pulley 43) are set to be of particularly high strength.

The first load transmission member 51 that is attached to the side member 15 and the side member 15 will now be described.

Figure 5:
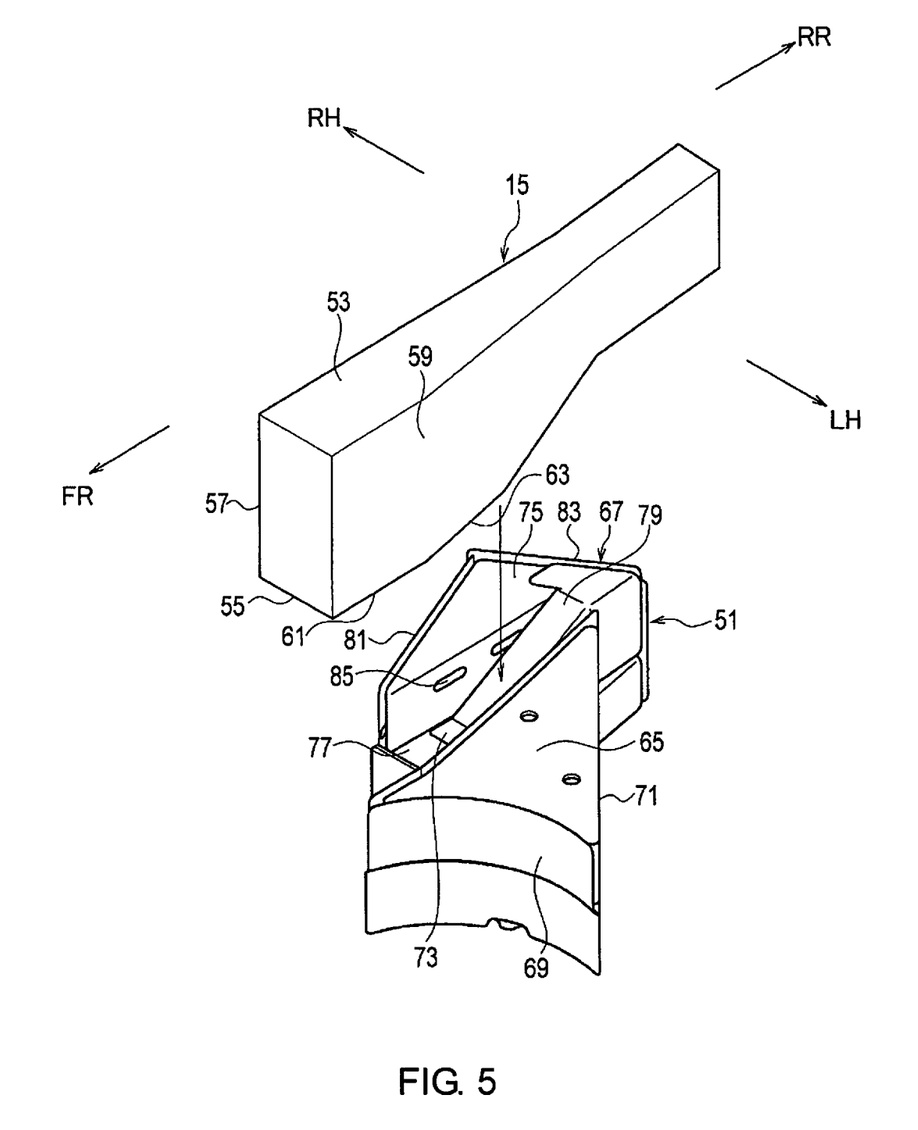
FIG. 5 is an exploded perspective view of the vehicle body front structure illustrating the front portion of the side member and a first load transmission member that is attached to the lower side of the front portion of the side member.
Figure 6:
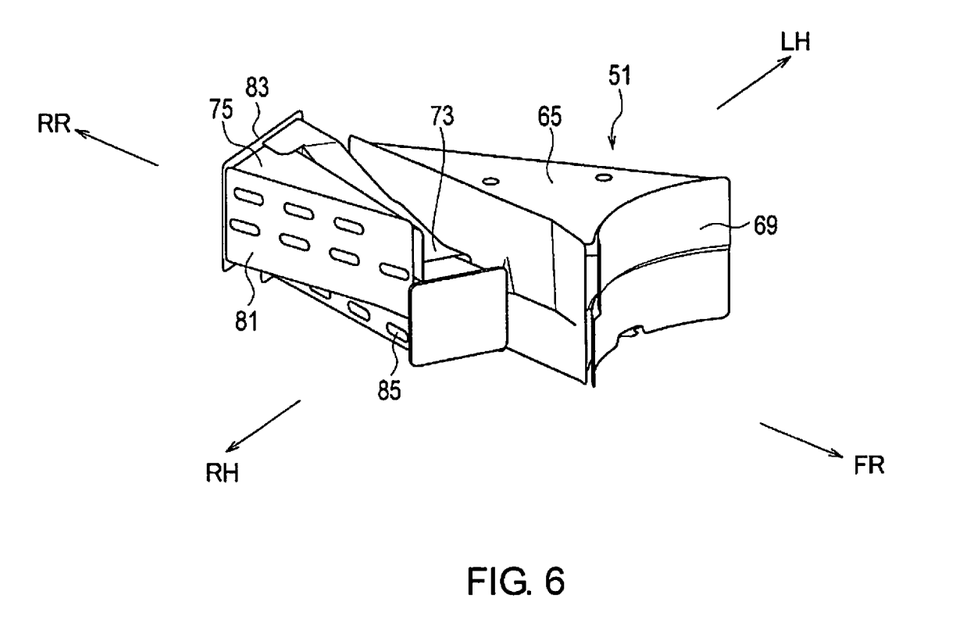
FIG. 6 is a perspective view of the first load transmission member of FIG. 5, as seen obliquely from above.

The side member 15 is formed from an upper surface 53, a bottom surface 55, and an inner-side surface 57 and an outer-side surface 59 that vertically connect the upper surface 53 and the bottom surface 55 to each other, to have a rectangular cross section, as illustrated in FIGS. 5 and 6. The bottom surface 55 has a flat portion 61 at the front end portion and an inclined portion 63 formed behind the flat portion 61.

The first load transmission member 51 is integrally formed from a load-receiving portion 65 that projects outward in the vehicle width direction (left side of the vehicle) and a load transmission portion 67 that is connected to the load-receiving portion 65 and that projects inward in the vehicle width direction (right side of the vehicle). The load-receiving portion 65 has the approximate form of a triangular prism. Specifically, a first load-receiving surface 69 formed on the front surface is formed extending toward the outer side in the vehicle width direction and is concavely curved toward the rear side of the vehicle. The rear surface portion 71 is formed in a flat shape, extending rearward in plan view, and toward the inner side in the vehicle width direction. The load transmission portion 67 is composed of a connecting portion 73 that is disposed on the center side of the load-receiving portion 65 in the vehicle width direction and integrally formed with the load-receiving portion 65, and a main body portion 75 that is integrally formed with the connecting portion 73 on the center side of the connecting portion 73 in the vehicle width direction. The upper surface of the connecting portion 73 abuts the bottom surface 55 of the front portion of the side member 15. That is, the upper surface of the connecting portion 73 is composed of a flat portion 77 that abuts the flat portion 61 of the bottom surface 55 of the side member 15, and an inclined portion 79 that abuts the inclined portion 63 of the bottom surface 55 of the side member 15. In addition, the main body portion 75 has the form of a triangular prism. Specifically, the side surface of the main body portion 75 has a front side inclined surface 81 that is inclined rearward in a plan view and toward the inner side in the vehicle width direction, and a rear side inclined surface 83 that is inclined rearward and toward the outer side in the vehicle width direction. Elliptically shaped bolt holes 85 are formed on the side surface of the main body portion 75, and it is possible to fasten the first load transmission member 51 to the side member 15 by inserting bolts into the bolt holes 85 and fastening the bolts to the side surface of the side member 15.

Figure 7:
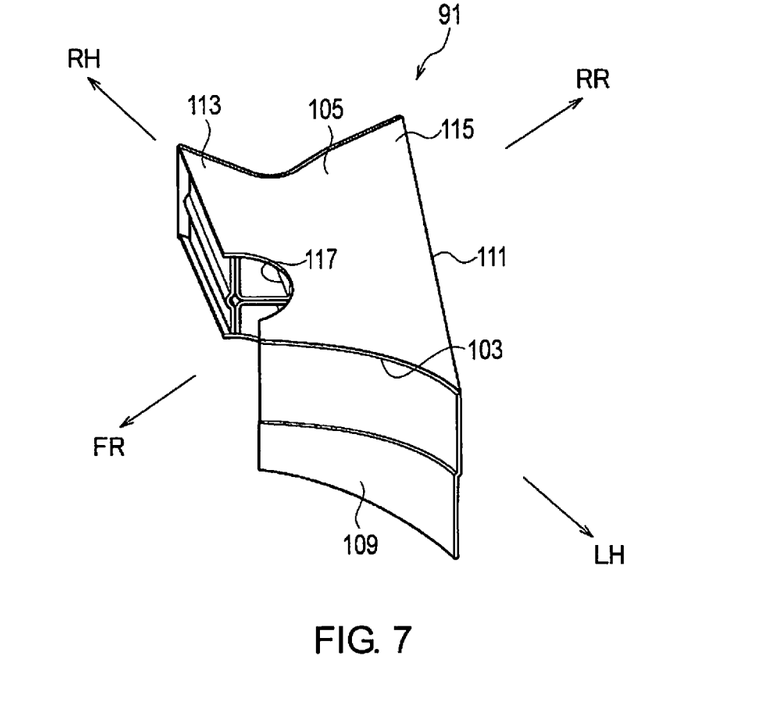
FIG. 7 is a perspective view of a second load transmission member, as seen obliquely from the front.
Figure 8:
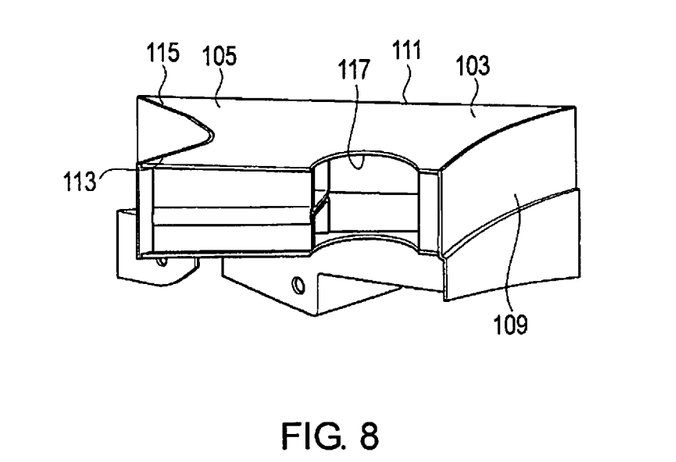
FIG. 8 is a perspective view of the second load transmission member, as viewed from the vehicle width direction.
Figure 9:
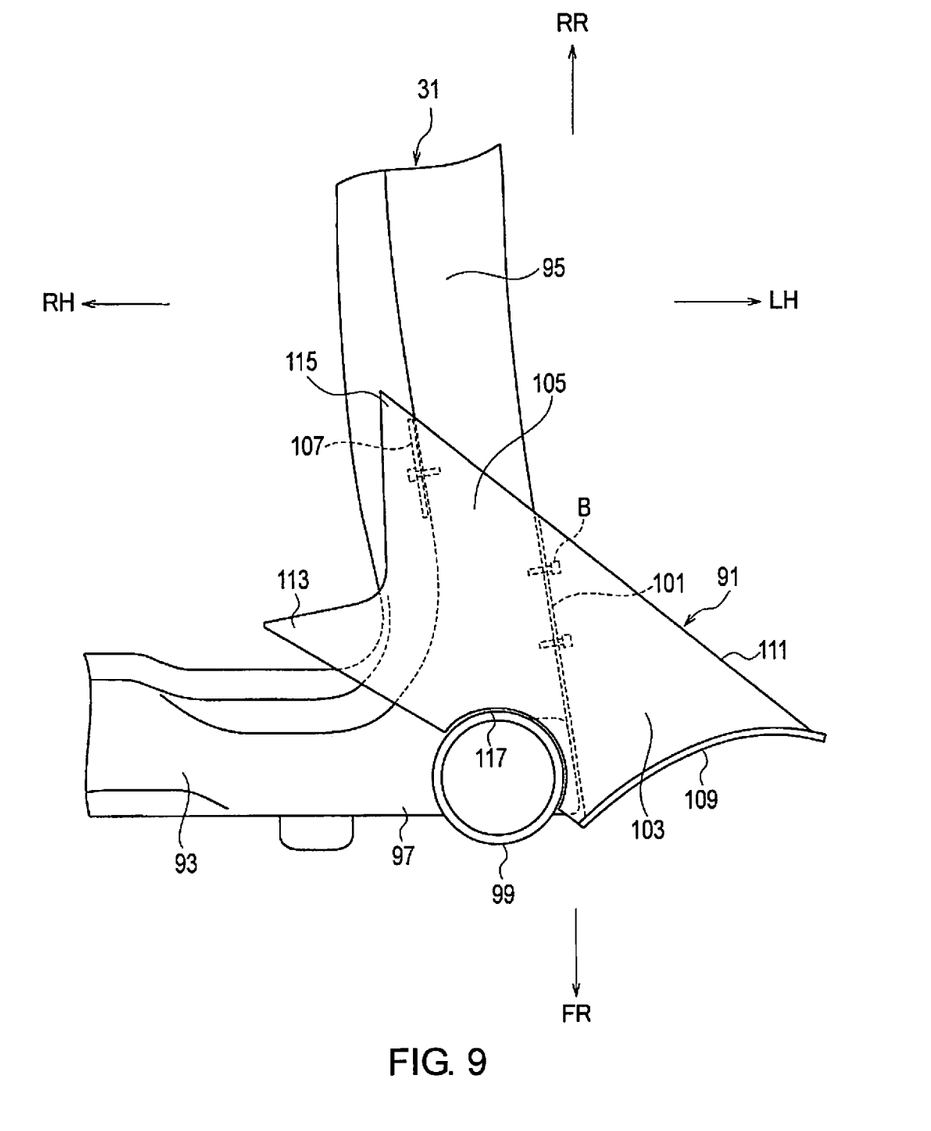
FIG. 9 is a plan view of a front corner of a suspension member and the second load transmission member, as viewed from above.

The second load transmission member 91 will now be described with reference to FIGS. 7-9.

The second load transmission member 91 is attached to the suspension member 31. The suspension member 31 has a front portion 93 that extends in the vehicle width direction and a side portion 95 that bends at the end of the front portion 93 in the vehicle width direction and extends rearward. A columnar connecting bracket 99 (refer to FIG. 4) is provided that extends in the vertical direction at the corner portion 97 where the front portion 93 and the side portion 95 intersect, and the suspension member 31 is suspended on the lower side of the side member 15 via the connecting bracket 99. Of the second load transmission member 91, the portion that is farther on the outer side in the vehicle width direction than the outer-side surface 101 of the suspension member 31 is formed in the load-receiving portion 103, and the portion that is farther on the inner side in the vehicle width direction than the outer-side surface 101 of the side portion 95 of the suspension member 31 is formed in the load transmission portion 105, as illustrated in FIG. 9. The second load transmission member 91 is fastened to the outer-side surface 101 and the inner-side surface 107 of the side portion 95 of the suspension member 31 via bolts B. In the load-receiving portion 103, the second load-receiving surface 109 on the front surface extends toward the outer side in the vehicle width direction and is concavely curved toward the rear side of the vehicle. The rear surface portion 111 is formed in a flat shape, extending rearward in a plan view, and toward the inner side in the vehicle width direction. The load transmission portion 105 extends rearward in a plan view, and diagonally toward the inner side in the vehicle width direction. Also, a first projecting portion 113 and a second projecting portion 115 are provided as a pair on the front side and the rear side, on the surface of the load transmission portion 105 that opposes the continuously variable transmission 29. A semicircular notch 117 is formed at a boundary portion between the load-receiving portion 103 and the load transmission portion 105. This notch 117 engages with the connecting bracket 99. In addition, the end portion of the load transmission portion 67 of the first load transmission member 51 is disposed in front of the left end portion of the continuously variable transmission 29, as illustrated in FIG. 2. The first projecting portion 113, which is the end portion of the load transmission portion 105 of the second load transmission member 91 is also disposed in front of the left end portion of the continuously variable transmission 29.

Figure 1:
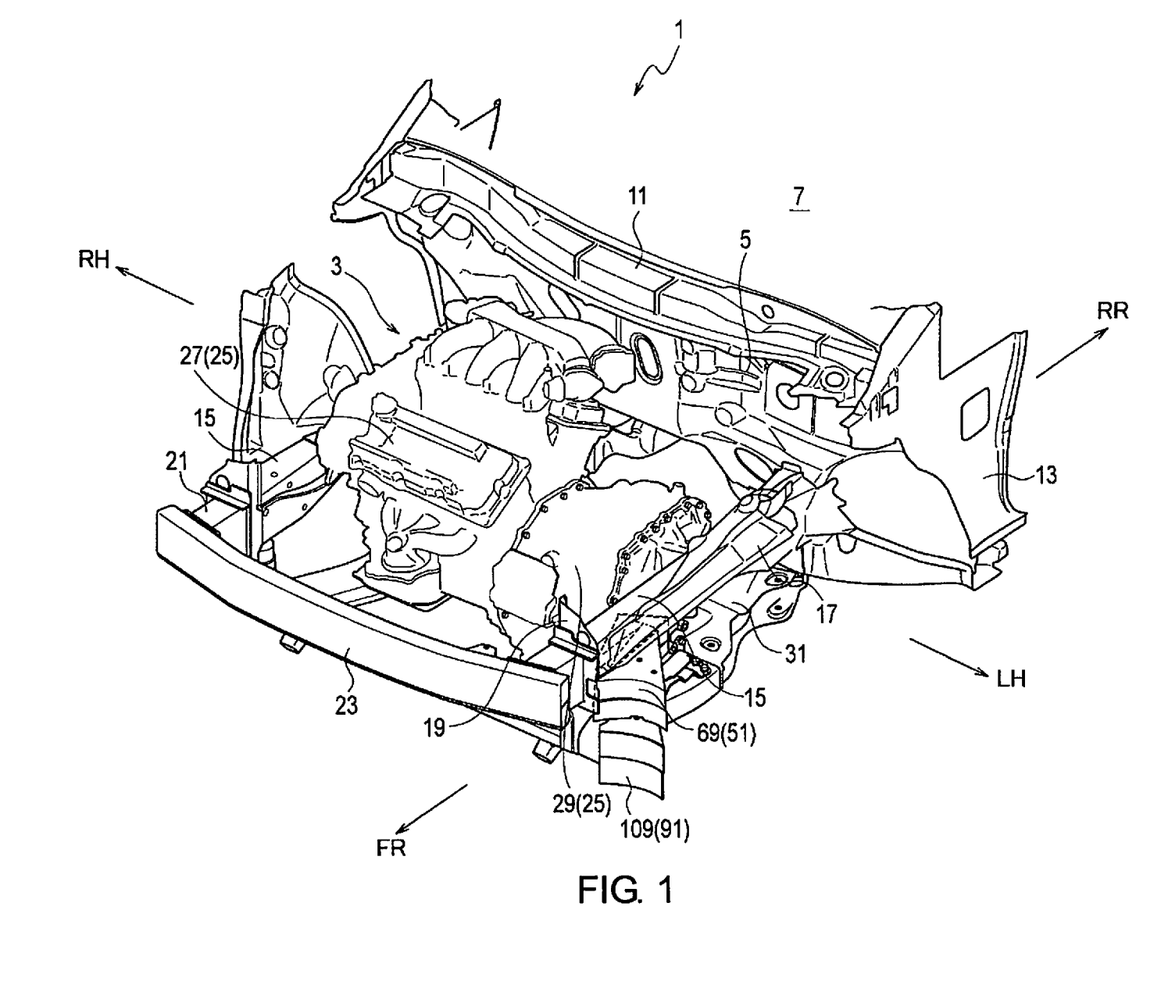
FIG. 1 is a perspective view of a vehicle body front structure according to an embodiment, as seen obliquely from above.

As viewed from the side of the vehicle, the first load transmission member 51 and the second load transmission member 91 overlap in the height direction with the input-side pulley 41 (transmission pulley), as illustrated in FIGS. 3 and 4. In addition, the first load-receiving surface 69 and the second load-receiving surface 109 are arranged to be aligned as viewed from above the vehicle, as illustrated in FIGS. 1 and 2.

The way in which the collision load is transmitted in the case of a small overlap collision will now be described. In a small overlap collision, the collision load is input from a collision object 121 to a portion of the vehicle body positioned farther toward the outer side than the side member 15 in the vehicle width direction, as illustrated in FIG. 2.

When a collision object 121 moves rearward relative to the vehicle body, the collision object 121 collides simultaneously with the first load-receiving surface 69 of the first load transmission member 51 and the second load-receiving surface 109 of the second load transmission member 91. As a result, the collision load is received by the load-receiving portions 65, 103. Because the load transmission portions 67, 105 are fixed to the load-receiving portions 65, 103, the collision load received by the load-receiving portions 65, 103 is transmitted to the load transmission portions 67, 105. Therefore, the end portion of the load transmission portion 67 of the first load transmission member 51 and the first projecting portion 113, which is the end portion of the load transmission portion 105 of the second load transmission member 91, both move rearward together with the load-receiving portions 65, 103, and collide with left end portion of the continuously variable transmission 29. Here, because the transmission pulleys (input-side pulley 41, output-side pulley 43) are of greater strength than the other component parts of the continuously variable transmission 29, the yield strength thereof with respect to the input load is high. Therefore, even if the end portion of the load transmission portion 67 of the first load transmission member 51 and the first projecting portion 113 of the second load transmission member 91 hit the continuously variable transmission 29, the transmission pulleys (input-side pulley 41, output-side pulley 43) are less likely to be damaged, and it becomes possible to transmit the collision load to the engine 27 efficiently via the transmission pulleys.

The action and effects of the embodiment of the present invention will now be described.

(1) A vehicle body front structure is provided with a power train 25 that is disposed in a front portion of a vehicle and that has an engine 27 and a continuously variable transmission 29 arranged in parallel in the vehicle width direction, a side member 15 that is disposed on the outer side of the power train 25 in the vehicle width direction and that extends in the longitudinal direction of the vehicle, a suspension member 31 that is disposed below the side member 15, and load transmission members (first load transmission member 51, second load transmission member 91) that are attached to at least one of the side member 15 and the suspension member 31. In the power train 25, the continuously variable transmission 29 is disposed on the load transmission member side, and the continuously variable transmission 29 comprises transmission pulleys (input-side pulley 41, output-side pulley 49). The load transmission member comprises load-receiving portions 65, 103 that project farther on the outer side in the vehicle width direction than a side surface of the side member 15 or the suspension member 31 on the outer side in the vehicle width direction, and that receive the load towards a rear of the vehicle, and load transmission portions 67, 105 that are joined to the load-receiving portions 65, 103 and that transmit the load received by the load-receiving portions 65, 103 to transmission pulleys (input-side pulley 41, output-side pulley 43) of the continuously variable transmission 29.

Thus, it is possible to transmit the collision load that is received by the load transmission members to the engine 27 efficiently via the transmission pulleys (input-side pulley 41, output-side pulley 43), at the time of a so-called small overlap collision, in which the collision object 121 collides with an outer end portion of a host vehicle in the vehicle width direction.

That is, because, of the component parts of the continuously variable transmission 29, the transmission pulleys (input-side pulley 41, output-side pulley 43) are of particularly high strength, the yield strength of transmission pulleys with respect to the input load will be high. Thus, because the transmission pulleys are not likely to be crushed, even if collision load received by the load transmission members is input to the transmission pulleys, it is possible to transmit the collision load to the engine 27 efficiently via the transmission pulleys.

(2) The load transmission members (first load transmission member 51, second load transmission member 91) are arranged in positions overlapping in a height direction with the transmission pulley (input-side pulley 41) of the continuously variable transmission 29 as viewed from the side of the vehicle.

Because the load transmission members overlap the transmission pulley (input-side pulley 41) in the height direction in this manner, it becomes likely that the load transmission member will collide with the transmission pulley (input-side pulley 41) at the time of a vehicle collision. Therefore, it is possible to transmit the collision load to the engine 27 more efficiently via the transmission pulley.

(3) The load transmission members include a first load transmission member 51 that is attached to the side member 15 and a second load transmission member 91 that is attached to the suspension member 31.

In this manner, the load transmission members are configured from both the first load transmission member 51 and the second load transmission member 91. Thus, the total area of the load-receiving surface of the load transmission members increases compared to the case in which only one of the first load transmission member 51 and the second load transmission member 91 is provided. Thus, because the load received by the load transmission members is dispersed across a wide range, the burden of the load that is input to each load transmission member is reduced.

(4) A first load-receiving surface 69 is formed on the front surface of the first load transmission member 51, a second load-receiving surface 109 is formed on the front surface of the second load transmission member 91, and the first load-receiving surface 69 and the second load-receiving surface 109 are arranged to be aligned as viewed from above the vehicle.

Because the first load-receiving surface 69 and the second load-receiving surface 109 are arranged to be aligned in this manner, it is possible for the first load-receiving surface 69 and the second load-receiving surface 109 to simultaneously receive load from a collision object 121.

Here, if the first load-receiving surface 69 and the second load-receiving surface 109 are arranged in different positions in the front-rear direction, the load-receiving surface that is arranged on the front side would contact the collision object first, and the input amount of the collision load would be greater therein.

Thus, it is possible to transmit the collision load to the engine 27 more efficiently compared to the case in which the first load-receiving surface 69 and the second load-receiving surface 109 are arranged in different positions in the front-rear direction.

The present invention is not limited to the embodiment described above, and various modifications are possible within the scope of the present invention.

The invention claimed is:

1. A vehicle body front structure comprising:
a power train disposed in a front portion of a vehicle and including an engine and a continuously variable transmission arranged in parallel in a vehicle width direction;
a side member disposed on an outer side of the power train in the vehicle width direction and extending in a longitudinal direction of the vehicle;
a suspension member disposed below the side member; and
a load transmission member attached to at least one of the side member and the suspension member;
the continuously variable transmission being disposed on a load transmission member side of the power train,
the continuously variable transmission includes a transmission pulley,
the load transmission member comprising a load-receiving portion that projects farther on the outer side in the vehicle width direction than a side surface of the side member or the suspension member on the outer side in the vehicle width direction, and the load-receiving portion that receives a load towards a rear of the vehicle, and a load transmission portion that is joined to the load-receiving portion and that transmits the load received by the load-receiving portion to the transmission pulley of the continuously variable transmission, and
the transmission pulley overlapping with the load transmission portion in the vehicle width direction as viewed from in front of the vehicle, and being arranged in a position overlapping in a height direction with the load transmission member as viewed from a side of the vehicle.

2. The vehicle body front structure as recited in claim 1, wherein
the load transmission member includes a first load transmission member that is attached to the side member and a second load transmission member that is attached to the suspension member.

3. The vehicle body front structure as recited in claim 2, wherein
a first load-receiving surface is formed on a front facing surface of the first load transmission member, a second load-receiving surface is formed on a front facing surface of the second load transmission member, and the first load-receiving surface and the second load-receiving surface are arranged to be aligned as viewed from above the vehicle.

* * * * *